June 2, 1953 — F. W. POWERS — 2,640,502
KINK PREVENTING HOSE INSERT
Filed Feb. 1, 1950
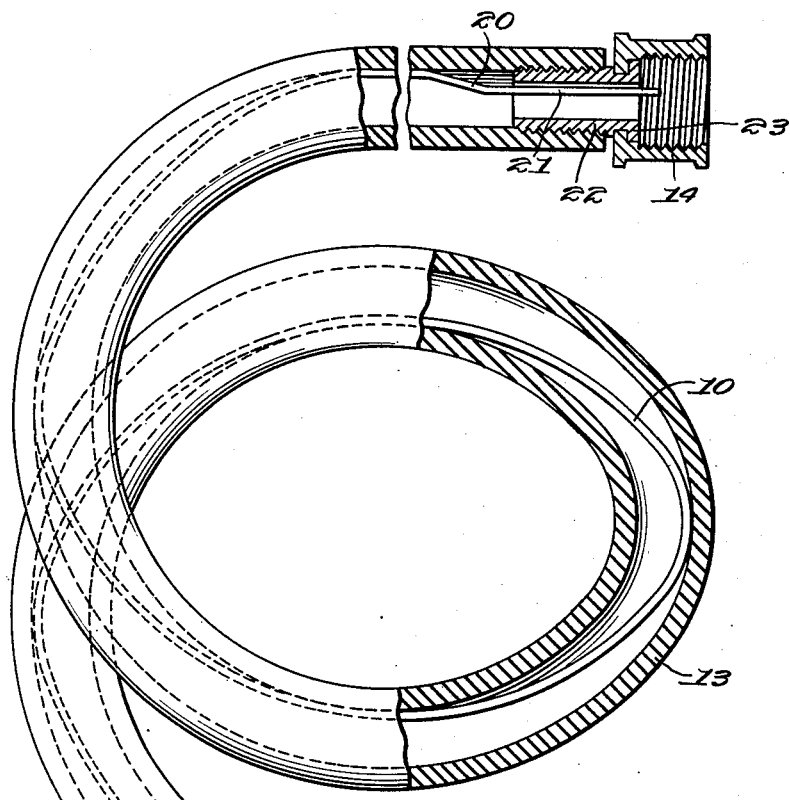
Fig. 1.
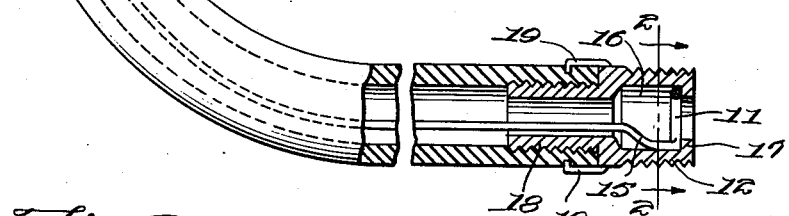
Fig. 2.
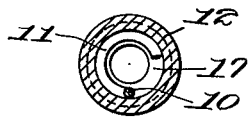
INVENTOR.
Felix W. Powers,
BY Victor J. Evans & Co.
ATTORNEYS Patented June 2, 1953

2,640,502

UNITED STATES PATENT OFFICE 2,640,502

KINK PREVENTING HOSE INSERT

Felix W. Powers, Arcadia, Calif.

Application February 1, 1950, Serial No. 141,711

1 Claim. (Cl. 138—61)

This invention relates to devices for preventing kinking of hose, such as pneumatic and garden hose, and in particular a hose having a continuous spring wire extended throughout the length thereof for preventing sharp bending and kinking.

The purpose of this invention is to provide means for preventing kinking of hose that is incorporated entirely within the hose and that does not interfere with the use thereof.

Various devices have been provided for preventing sharp bends and kinking of hose, telephone cables and other devices but where devices of this type are used on the exterior of the hose they are objectionable and often break through continuous use of the hose. With this thought in mind this invention contemplates a device for preventing kinking of hose that is inserted inside of the hose and extends continuously throughout the length thereof wherein handling of the hose, instead of being hindered, is facilitated.

The object of this invention is, therefore, to provide means for preventing sharp bends and kinks in hose that is incorporated within the hose.

Another object of the invention is to provide means for preventing kinking in hose that may be inserted in hose now in use.

A further object of the invention is to provide means for preventing kinking in hose which is of a simple and economical construction.

With these and other objects and advantages in view the invention embodies a continuous spring wire having a ring formed at one end by which the end of the wire is secured in a male coupling of a garden hose or the like and the body of the spring wire is extended from the male coupling throughout the length of the hose and into a female coupling on the opposite end.

Other features and advantages of the invention will appear from the following description taken in connection with the drawing wherein:

Figure 1 is an elevational view of a section of hose with parts of the ends and intermediate parts thereof broken away showing the spring wire incorporated therein.

Figure 2 is a cross section through the male coupling member of the hose showing the ring formed on the end of the spring wire, said section being taken on line 2—2 of Figure 1.

Referring now to the drawings wherein like reference characters denote corresponding parts the kink preventing device of this invention includes a spring wire 10 having a ring 11 formed on one end with the ring inserted in a male coupling 12 of a hose 13 and with the opposite end of the spring wire extended into a female coupling element 14 on the opposite end of the hose.

The spring wire may be formed of any suitable gauge depending upon the type of hose in which it is used and the ring 11 is formed at the end of an offset section 15 at one end of the wire 10. The ring 11 is positioned in an annular recess 16 of the male coupling 12 and the outer end of the coupling is provided with an annular flange 17. With the inner end provided with a threaded shank 18 over which one end of the hose 13 is positioned, and with the parts formed in this manner the end of the spring wire with the ring 11 thereon is provided with a slight freedom of movement to compensate for rolling and bending the hose. The coupling member 12 may be secured to the end of the hose by clamps or jaws 19 or by any suitable means.

The opposite end of the spring wire 10 is provided with a slight offset 20 whereby with the wire bearing against the inner surface of the hose the end 21 will extend freely through the nipple 22 over which the end of the hose is positioned and on which the female coupling member 14 is rotatably mounted. The end of the spring wire extends through an annular flange 23 on the end of the nipple 22 and with the end freely positioned the wire is free to slide inwardly and outwardly with the hose extended straight or rolled on a reel.

With the parts arranged in this manner the spring wire bends with the hose but the wire has sufficient strength to prevent sharp bending and therefore makes it substantially impossible to kink the hose. The spring in the wire permits the wire to straighten out with the hose so that it does not interfere with usual use of the hose.

It will be understood that modifications may be made in the design and arrangement of the parts without departing from the spirit of the invention.

What is claimed is:

A male coupling element for a tubular member comprising a threaded shank portion of reduced diameter to receive the tubular member and an enlarged threaded coupling portion having an inner annular flange on the outer end thereof the junction of the two portions providing a shoulder for abutment with the end of the tubular member received on the reduced threaded shank portion, an annular recess in said enlarged portion of the same diameter as said reduced threaded shank portion, a spring wire adapted to extend through said male coupling into said tubular member, an offset portion at one end of the spring wire, a ring portion extending at right angles to the axis of the offset portion and on the outer end of the offset portion adapted to be received in the annular recess in the enlarged portion and having abutting engagement with the said annular recess and means for retaining the tubular member on said reduced portion.

FELIX W. POWERS.

References Cited in the file of this patent

UNITED STATES PATENTS

| Number | Name | Date |
|---|---|---|
| 790,971 | Nicholls | May 30, 1905 |
| 1,560,789 | Johnson et al. | Nov. 10, 1925 |
| 1,921,530 | Lerch | Aug. 8, 1933 |
| 2,206,703 | Lowe | July 2, 1940 |
| 2,277,864 | Horvath | Mar. 31, 1942 |
| 2,497,225 | Lerch | Feb. 14, 1950 |